(12) United States Patent
Yeandel

(10) Patent No.: US 12,516,633 B2
(45) Date of Patent: Jan. 6, 2026

(54) ACCESSORY POWER MODULE

(71) Applicant: ROLLS-ROYCE plc, London (GB)

(72) Inventor: Michael Yeandel, Bristol (GB)

(73) Assignee: Rolls-Royce plc

( * ) Notice: Subject to any disclaimer, the term of this patent is extended or adjusted under 35 U.S.C. 154(b) by 15 days.

(21) Appl. No.: 18/643,352

(22) Filed: Apr. 23, 2024

(65) Prior Publication Data

US 2024/0376846 A1  Nov. 14, 2024

(30) Foreign Application Priority Data

May 12, 2023  (GB) ...................................... 2307055

(51) Int. Cl.
  *F02C 7/32* (2006.01)
  *F02C 7/14* (2006.01)
(52) U.S. Cl.
  CPC .................. *F02C 7/32* (2013.01); *F02C 7/14* (2013.01); *F05D 2220/323* (2013.01); *F05D 2220/76* (2013.01); *F05D 2260/213* (2013.01); *F05D 2260/4031* (2013.01)
(58) Field of Classification Search
  None
  See application file for complete search history.

(56) References Cited

U.S. PATENT DOCUMENTS

| 8,026,624 | B2 | 9/2011 | Beutin et al. |
| 8,042,341 | B2 | 10/2011 | Charier et al. |
| 9,018,806 | B2 | 4/2015 | Beier et al. |
| 9,077,221 | B2 * | 7/2015 | McCormick .............. F02K 3/02 |
| 9,097,134 | B2 * | 8/2015 | Ferch ...................... F01D 15/10 |
| 10,519,869 | B2 | 12/2019 | Attridge et al. |
| 11,230,941 | B2 | 1/2022 | Bradley |
| 11,549,438 | B2 | 1/2023 | Bradbrook et al. |
| 11,788,428 | B2 * | 10/2023 | Simonetti ............ H02K 7/1823 |
| | | | 290/52 |

(Continued)

FOREIGN PATENT DOCUMENTS

EP          4148262 A1        3/2023

OTHER PUBLICATIONS

Great Britain search report dated Nov. 13, 2023, isuued in GB Patent Application No. 2307055.0.

(Continued)

*Primary Examiner* — David P. Olynick
(74) *Attorney, Agent, or Firm* — Barnes & Thornburg

(57) ABSTRACT

The present disclosure provides an accessory power module for a gas turbine engine having a high-pressure spool and a low-pressure spool, the accessory power module comprising: a first electrical machine configured to couple to the low-pressure spool of the gas turbine engine; a casing housing the first electrical machine, the casing comprising at least one support element configured to support the first electrical machine within the casing, wherein the casing is configured for airflow therethrough; an accessory gearbox comprising an input coupling configured to couple to the high-pressure spool of the gas turbine engine, the accessory gearbox mounted to the casing; and a second electrical machine configured to couple to an output coupling of the accessory gearbox; wherein the casing is configured to be mounted along an inlet air flow path into the gas turbine engine.

19 Claims, 9 Drawing Sheets

(56) References Cited

U.S. PATENT DOCUMENTS

| | | | |
|---|---|---|---|
| 2006/0101804 A1* | 5/2006 | Stretton | F02K 3/04 |
| | | | 60/226.1 |
| 2011/0154827 A1 | 6/2011 | Ress, Jr. et al. | |
| 2017/0159569 A1* | 6/2017 | Miller | F02C 7/06 |
| 2017/0334377 A1 | 11/2017 | Klemen et al. | |
| 2018/0118357 A1* | 5/2018 | Yasuda | F02C 7/32 |
| 2019/0316486 A1* | 10/2019 | Roberge | F02C 7/18 |
| 2020/0227966 A1* | 7/2020 | Harvey | B64C 11/46 |
| 2020/0227988 A1* | 7/2020 | Zhu | H02K 16/02 |
| 2020/0291810 A1* | 9/2020 | Spierling | F02K 1/04 |
| 2021/0115854 A1* | 4/2021 | Pikovsky | F02C 7/143 |
| 2021/0324799 A1* | 10/2021 | Suzuki | B64D 33/08 |
| 2022/0099031 A1* | 3/2022 | Miller | F01D 25/28 |
| 2022/0307418 A1* | 9/2022 | Vitt | F02C 7/32 |
| 2023/0143382 A1* | 5/2023 | Bergo | F01D 15/10 |
| | | | 60/802 |
| 2024/0280053 A1* | 8/2024 | Sibbach | F02C 7/04 |
| 2024/0376846 A1* | 11/2024 | Yeandel | F02C 7/36 |

OTHER PUBLICATIONS

European search report dated Sep. 26, 2024, issued in EP Patent Application No. 24171576.2.

* cited by examiner

ACCESSORY POWER MODULE

CROSS-REFERENCE TO RELATED APPLICATIONS

This disclosure claims the benefit of UK Patent Application No. GB 2307055.0, filed on 12 May 2023, which is hereby incorporated herein in its entirety.

BACKGROUND

Technical Field

The present disclosure relates to an accessory power module for a gas turbine engine, a gas turbine engine assembly, and an aircraft.

Description of Related Art

Gas turbine engines generally comprise one or more rotating spools. A spool is a term used for the combination of a compressor, a turbine, and a drive shaft connecting the turbine to the compressor to drive it. Gas turbines can have multiple spools, such as a high-pressure spool and a low-pressure spool, which are arranged concentrically around one another. Gas turbine engines have an accessory drive, which is a gearbox that drives accessories which are essential for the operation of the engine or the aircraft. The accessory drive can typically be used to drive a starter generator, fuel pumps, oil pumps, hydraulic pumps, and other accessory systems. The drive power for the accessory drive is typically taken from the high-pressure spool via a power offtake shaft. The accessory drive can be mounted to the airframe of the aircraft.

This arrangement has drawbacks, in that the power that the accessory drive can provide to the aircraft is limited by the amount of power that can be taken off the high-pressure spool before impacting engine performance. This power capacity can be increased by increasing the size of the engine, but this results in additional weight and increases the size of the airframe required to house the engine, which is undesirable.

It is therefore a challenge to provide an accessory drive arrangement which maximises the power available for accessories whilst also being efficiently housed with respect to the engine and the airframe.

SUMMARY

According to a first aspect of the present disclosure, there is provided an accessory power module for a gas turbine engine having a high-pressure spool and a low-pressure spool, the accessory power module comprising: a first electrical machine configured to couple to the low-pressure spool of the gas turbine engine; a casing housing the first electrical machine, the casing comprising at least one support element configured to support the first electrical machine within the casing, wherein the casing is configured for airflow therethrough; an accessory gearbox comprising an input coupling configured to couple to the high-pressure spool of the gas turbine engine, the accessory gearbox mounted to the casing; and a second electrical machine configured to couple to an output coupling of the accessory gearbox; wherein the casing is configured to be mounted along an inlet air flow path into the gas turbine engine.

The casing may comprise an airflow duct configured to form a portion of the inlet air flow path into the gas turbine engine when the casing is mounted along the inlet air flow path into the gas turbine engine.

The accessory gearbox may be mounted to an external surface of the casing.

The casing may comprise an annular wall. The accessory gearbox may be mounted to the annular wall. The annular wall of the casing may be arranged concentrically and/or coaxially with the low pressure and high-pressure spools.

The at least one support element may be configured to support the first electrical machine within the casing such that when the casing is mounted to an air intake of the gas turbine engine at the attachment interface, the first electrical machine is positioned concentrically and/or coaxially with respect to the high-pressure spool and the low-pressure spool.

When the casing is mounted along the inlet air flow path into the gas turbine engine, the first electrical machine may be positioned within the inlet air flow path.

The casing may comprise at least one accessory conduit configured to carry one or more accessory supply lines to and from the first electrical machine.

The at least one accessory conduit may be formed as part of the at least one support element.

The one or more accessory supply lines may include at least a portion of an electrical supply line, a lubricant supply loop, and/or a cooling loop.

The accessory power module may further comprise an air heat exchanger contained within the casing. The air heat exchanger may be configured for heat exchange with air flow along an inlet air flow path into the gas turbine engine when the casing is mounted along an inlet air flow path into the gas turbine engine.

The air heat exchanger may be part of a cooling loop. The air heat exchanger may be configured to provide heat exchange between a coolant in the cooling loop and air flow along an inlet air flow path into the gas turbine engine when the casing is mounted along an inlet air flow path into the gas turbine engine.

The accessory power module may further comprise a lubricant heat exchanger part of a lubricant supply loop. The lubricant heat exchanger may be configured to provide heat exchange between the coolant in the cooling loop and a lubricant in the lubricant loop when the casing is mounted along an inlet air flow path into the gas turbine engine.

The air heat exchanger may be incorporated into the at least one support element.

The support element may comprise a plurality of vanes. The plurality of vanes may extend radially between an outer wall of the casing and the first electrical machine. The plurality of vanes may extend radially across the air inlet flow path.

The plurality of vanes may extend radially between the first electrical machine and an outer radial extent of the inlet air flow path into the gas turbine engine when the casing is mounted along the inlet air flow path into the gas turbine engine.

The at least one accessory conduit may be formed as part of one or more vanes of the plurality of vanes.

The air heat exchanger may be disposed between adjacent vanes of the plurality of vanes.

The heat exchanger may be integrated into one or more vanes of the plurality of vanes.

The casing may comprise an attachment interface configured for attachment to at least one of an air intake of the gas turbine engine and an airframe of an aircraft. When the casing is attached to an air intake of the gas turbine engine and/or an airframe of an aircraft at the attachment interface, the casing may be configured to be disposed along the inlet air flow path into the gas turbine engine.

According to a second aspect of the present disclosure, there is provided a gas turbine engine assembly, comprising: a gas turbine engine having a high-pressure spool and a low-pressure spool; an air intake for the gas turbine engine, the air intake defining at least part of an inlet air flow path into the gas turbine engine; and an accessory power module according to the first aspect, wherein the casing is mounted along the inlet air flow path into the gas turbine engine; and wherein the first electrical machine is coupled to the low-pressure spool and the input coupling of the accessory gearbox is coupled to the high-pressure spool.

The casing may be attached to the air intake at an attachment interface.

According to a third aspect of the present disclosure, there is provided an aircraft comprising: a gas turbine engine having a high-pressure spool and a low-pressure spool, the gas turbine engine mounted to an airframe of the aircraft; an air intake for the gas turbine engine, the air intake mounted to an airframe of the aircraft and the air intake defining at least part of an inlet air flow path into the gas turbine engine; and an accessory power module according to the first aspect, wherein the casing of the accessory power module is mounted along the inlet air flow path into the gas turbine engine; wherein the first electrical machine is coupled to the low-pressure spool and the input coupling of the accessory gearbox is coupled to the high-pressure spool.

The casing may be attached to one or more of the air intake or the airframe at an attachment interface.

The aircraft may further comprise a fire bulkhead separating the airframe and the air intake from the gas turbine engine. The casing may be attached to the fire bulkhead at a bulkhead attachment interface.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
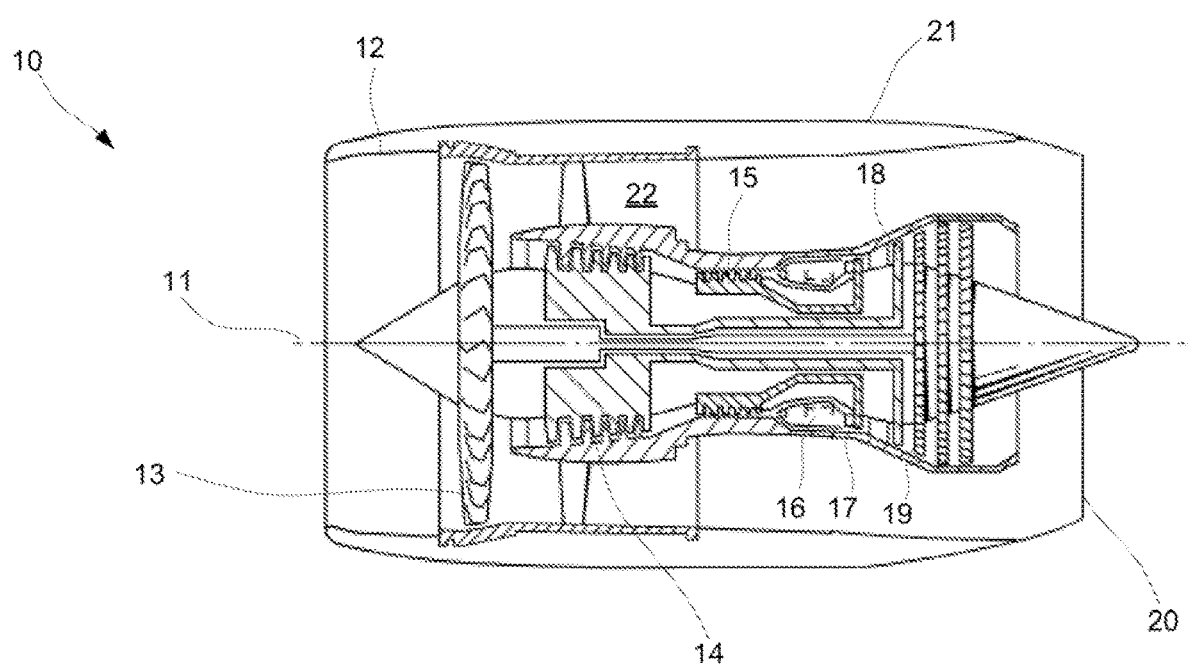
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by a suitable interconnecting shaft.

Other gas turbine engines to which the present disclosure may be applied may have alternative configurations. By way of example such engines may have an alternative number of interconnecting shafts (e.g., two) and/or an alternative number of compressors and/or turbines. Further the engine may comprise a gearbox provided in the drive train from a turbine to a compressor and/or fan.

The combination of a turbine, a compressor, and an interconnecting shaft which drives the compressor is known as a spool of a gas turbine engine. Some gas turbine engines have two such spools, having a high-pressure spool and a low-pressure spool. A high-pressure spool comprises a high-pressure compressor, a high-pressure turbine, and a high-pressure shaft. A low-pressure spool comprises a low-pressure compressor, a low-pressure turbine, and a low-pressure shaft.

Figure 2:
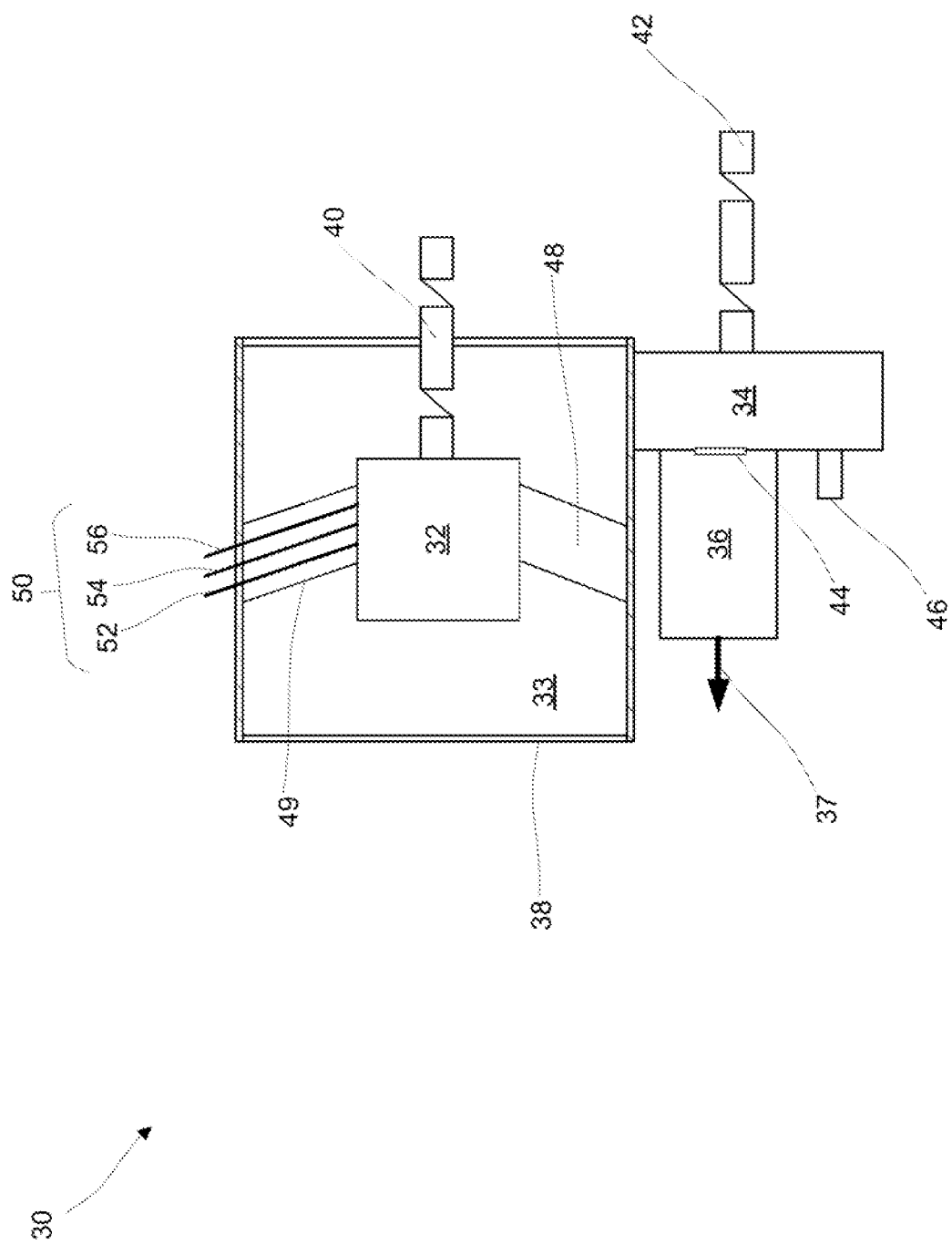
FIG. 2 is a sectional side view of a first example accessory power module according to the present disclosure.
Figure 3:
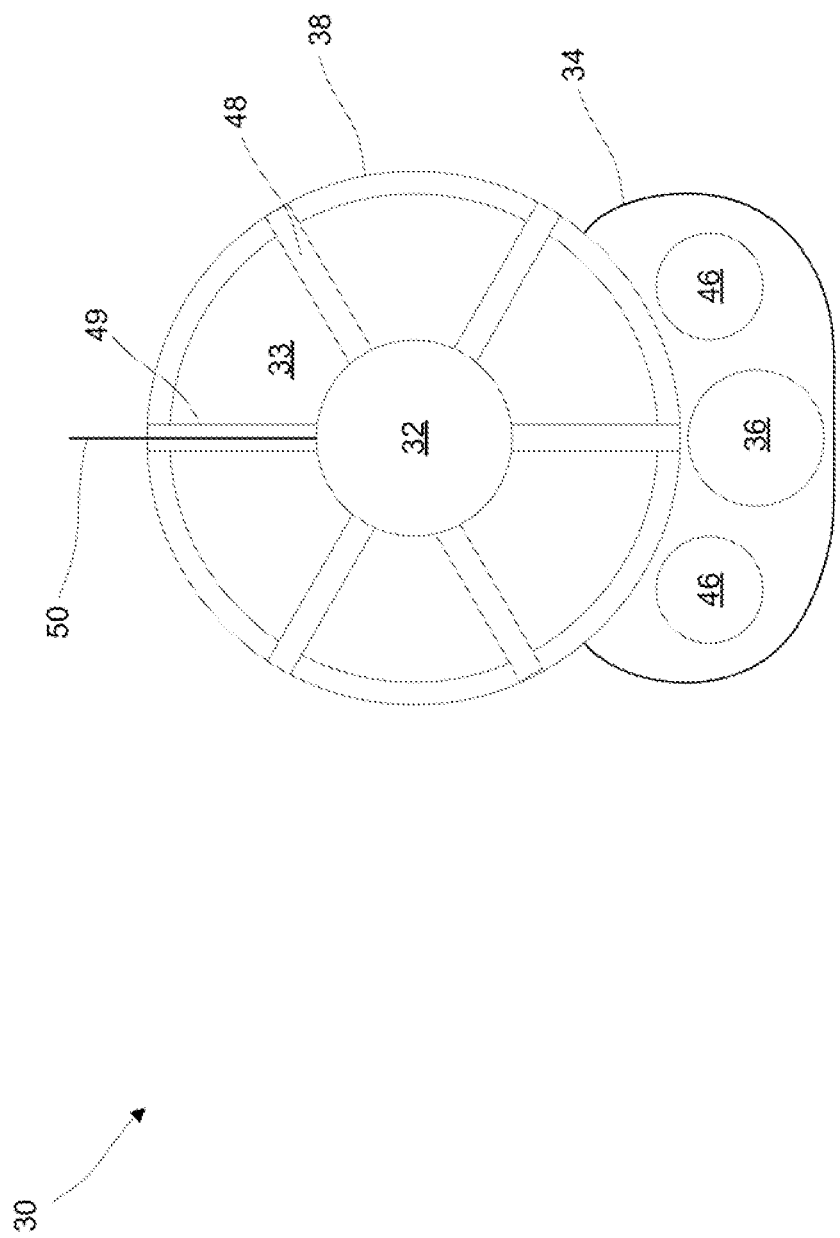
FIG. 3 is a front view of the first example accessory power module of FIG. 2.

FIG. 2 shows a first example accessory power module 30. The accessory power module 30 is configured for use with a gas turbine engine having at least two spools, for example a high-pressure spool and a low-pressure spool. The accessory power module 30 comprises a first electrical machine 32, an accessory gearbox 34, a second electrical machine 36, and a casing 38.

The first electrical machine 32 is configured to couple to a low-pressure spool of a gas turbine engine. The first electrical machine 32 has a first coupling 40 configured to mechanically couple to the low-pressure spool of the gas turbine engine, such that rotation of the low-pressure spool drives the first electrical machine 32. The first coupling 40 is a flexible coupling. In other examples, the first coupling 40 may be any other type of coupling. The first electrical machine 32 is an electrical generator. The electrical generator may be any suitable type of electrical generator, such as induction generators or permanent magnet generators. The first electrical machine 32 is configured to generate electrical power from the rotational power received from the low-pressure spool. The electrical power may be used for one or more accessories or subsystems of the gas turbine engine or an aircraft associated with the gas turbine engine.

The first electrical machine 32 is housed within a casing 38. The casing 38 is configured to permit airflow therethrough. The casing 38 is generally annular. The casing 38 comprises an annular outer wall having open axial ends. The casing 38 thereby comprises an airflow duct 33 which permits airflow therethrough. The open axial ends enable air to flow through the casing 38. The casing 38 comprises at least one support element configured to support the first electrical machine 32 within the casing 38. The at least one support element may also include an accessory conduit configured to carry one or more accessory supply lines to and from the first electrical machine 32.

The support element is formed by a plurality of radially extending vanes 48, which extend between the first electrical machine 32 and the annular outer wall of the casing 38. The vanes 48 are configured to support the first electrical machine 32 at a radially central position within the casing, as shown in, which shows a front view of the accessory power module 30. The vanes 48 are formed so as to enable air to flow axially through the casing 38. For example, the vanes 48 may act as guide vanes for a gas turbine engine. The plurality of vanes 48 may comprise any number of vanes which enables air to flow through the casing 38. When the casing 38 is mounted within an inlet air flow path into a gas turbine engine, the plurality of vanes 48 are configured to extend radially between the first electrical machine 32 and an outer radial extent of the inlet air flow path.

One or more of the vanes 48 may be an accessory vane 49 having an accessory conduit configured to carry one or more accessory supply lines 50 to and from the first electrical machine 32. The accessory vane 49 may be substantially hollow to incorporate the accessory conduit. The accessory supply lines 50 can include an electrical power line 54, a cooling line 54, and/or a lubricant supply line 56. The cooling line 54 may form part of a cooling loop, and the lubricant supply line 56 may form part of a lubricant supply loop. In other examples, the support element may comprise any suitable means which enables the first electrical machine 32 to be supported within the casing 38, for example the support element may comprise a bracket, or a platform, or supporting struts. In further examples, the accessory conduit may be separate from the support element.

The accessory gearbox 34 is configured to provide the mechanical power for various accessory systems for the gas turbine engine and an aircraft associated with the gas turbine engine. The accessory gearbox 34 has an input coupling 42 and a plurality of output couplings 44, 46. The input coupling 42 is configured to mechanically couple to a high-pressure spool of a gas turbine engine. For example, the input coupling 42 may be coupled to a power take-off which take rotational power off the high-pressure spool of the gas turbine engine. Rotation of the high-pressure spool is therefore configured to provide power input into the accessory gearbox 34. The input coupling 42 is a flexible coupling. In other examples, the input coupling 42 may be any other type of coupling. The accessory gearbox 34 contains a series of cooperating gears which enable the input power received by the input coupling 42 to be transmitted to the plurality of output couplings 44, 46.

A first output coupling 44 of the plurality of output couplings 44, 46 is configured to couple to the second electrical machine 36, such that the accessory gearbox 34 transmits rotational power to the second electrical machine 36. The second electrical machine 36 is an electrical generator configured to generate electrical power 37 from the rotational power input from the accessory gearbox 34. The generated electrical power 37 may be used for one or more subsystems of the gas turbine engine, or an aircraft associated with the gas turbine engine.

The plurality of output couplings 44, 46, includes one or more second output couplings 46 which are configured to provide mechanical power to one or more accessories associated with the gas turbine engine and/or the aircraft. For example, the one or more accessories may include a fuel pump, a lubricant pump, a hydraulic pump, a starter, a constant speed drive, or a tachometer.

The accessory gearbox 34 is mounted to an external surface of the casing. In particular, the accessory gearbox 34 is mounted to the annular outer wall of the casing 38. The accessory gearbox 34 and/or the casing 38 may comprise respective attachment interfaces which are configured to mate with one another to mount the accessory gearbox 34 to the outer wall of the casing 38. For example, the attachment interfaces may include any suitable attachment means, such as bolts or anchors, to enable the accessory gearbox 34 to be mounted to the outer wall of the casing 38. The attachment means may also enable the accessory gearbox 34 to be removably attached to the outer wall of the casing 38. In some examples, the second electrical machine 36 may also be mounted to the outer wall of the casing 38.

By mounting the accessory gearbox 34 to the casing 38, the first electrical machine 32, the casing 38, the accessory gearbox 34, and the second electrical machine form a single accessory power module that is configured for mounting in a gas turbine engine in substantially fewer steps than if each of the components were required to be mounted to the gas turbine engine separately.

Figure 4:
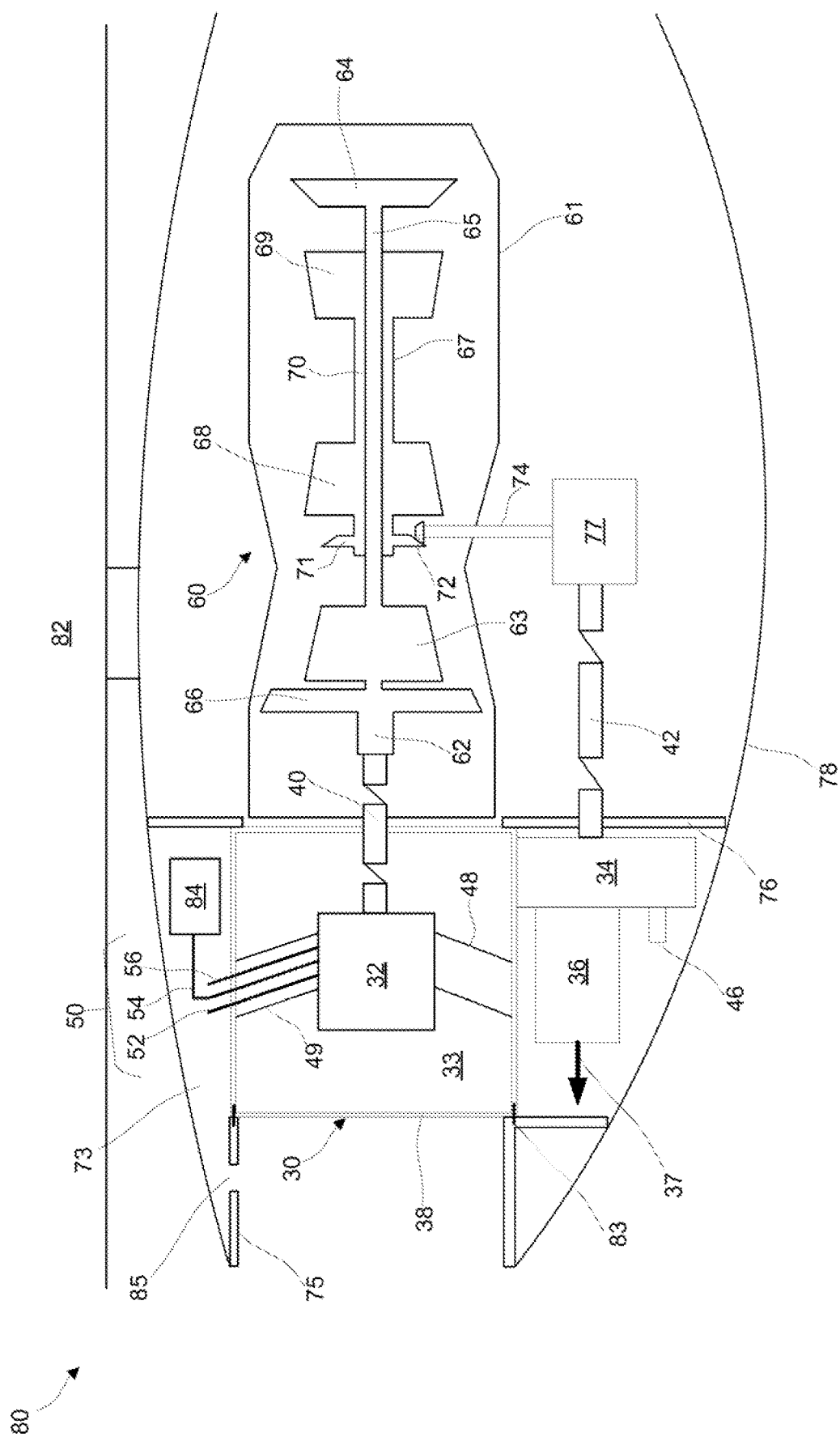
FIG. 4 is a sectional side view of a first example aircraft comprising the first example accessory power module of FIGS. 2 and 3.

FIG. 4 shows an aircraft 80 comprising a gas turbine engine assembly 60. The aircraft 80 comprises an airframe 82. The airframe 82 constitutes the mechanical structure of the aircraft and may include the fuselage, undercarriage, empennage, and wings of the aircraft.

The gas turbine engine assembly 60 comprises a gas turbine engine 61, an air intake 75, the accessory power module 30, and an engine housing 78. The gas turbine engine 61 comprises a low-pressure spool 62 and a high-pressure spool 67. The low-pressure spool 62 comprises a low-pressure compressor stage 63, a low-pressure turbine stage 64, and a low-pressure shaft 65 which interconnects the low-pressure compressor stage 63 and the low-pressure turbine stage 64. The low-pressure spool 62 also includes a fan 66 as part of the low-pressure compressor stage 63.

The high-pressure spool 67 comprises a high-pressure compressor stage 68, a high-pressure turbine stage 69, and a high-pressure shaft 70 which interconnects the high-pressure compressor stage 68 and the high-pressure turbine stage 69. The high-pressure spool 67 is arranged concentrically with respect to the low-pressure spool 62. The high-pressure shaft 70 comprises a power output coupling 71 which is configured to couple to a power offtake shaft 74. For example, the power output coupling 71 may comprise a bevel gear configured to couple to a respective bevel gear 72 of the power offtake shaft 74. The power offtake shaft 74 is a radial drive shaft. The power offtake shaft 74 is coupled to a propulsion gearbox 77. The propulsion gearbox 77 is configured to provide power to one or more propulsion sub-systems of the gas turbine engine, such as fuel, lubrication, actuation, and electrical power sub-systems. The propulsion gearbox 77 is also configured to provide power to the accessory gearbox 34. The propulsion gearbox 77 may be mounted to the gas turbine engine 61. The gas turbine engine assembly 60 is configured to be mounted to the airframe 82 via one or more mounts (not shown).

The air intake 75 defines a generally cylindrical passage which is configured to direct air flow into the gas turbine engine 61. The air intake 75 therefore defines at least part of an inlet air flow path into the gas turbine engine 61. The air intake 75 is formed as part of the engine housing 78. The air intake 75 may be integrally formed with the engine housing 78 or attached to the engine housing 78. The air intake 75 is spaced apart from the gas turbine engine 61 such that a chamber 73 is formed between the air intake 75 and the gas turbine engine 61. The chamber 73 is configured to receive the accessory power module 30. In particular, at least part of the casing 38 of the accessory power module 30 is configured to be mounted within the chamber 73. The casing 38 is therefore configured to be mounted within an inlet air flow path into the gas turbine engine 61. The airflow duct 33 of the casing 38 forms a portion of the inlet airflow path into the gas turbine engine 61. The casing 38 comprises an attachment interface 83 configured for attachment to the air intake 75. The attachment interface 83 may comprise any suitable attachment means, such as bolts, anchors, clamps, and circlips, which enable the casing 38 to be attached to the air intake 75. Alternatively, or in addition, the attachment interface 83 may be configured for attachment to the airframe 82 or the engine housing 78.

A fire bulkhead 76 is positioned directly upstream of the gas turbine engine 61. Here, the term upstream is used relative to the general direction of airflow through the gas turbine engine 61. The fire bulkhead 76 acts as a divider between the gas turbine engine 61 and the air intake 75 and the accessory power module 30 upstream of the gas turbine engine. The fire bulkhead 76 is fire retardant and acts to prevent any fires that may occur in the gas turbine engine 61 from reaching the accessory power module 30 and the air intake 75. The fire bulkhead 76 may be mounted to the engine housing 78 and/or the airframe 82. The casing 38 may comprise a bulkhead attachment interface configured for attachment to the fire bulkhead 76.

The first electrical machine 32 is coupled to the low-pressure spool 62 via the first coupling 40. In particular, the first electrical machine 32 is coupled to the fan 66 via the first coupling 40. The first coupling 40 is a flexible coupling, which compensates for any thermal or vibration effects during operation of the gas turbine engine 61. In other examples, the first coupling 40 may be a rigid coupling. The first coupling 40 may be integrated into a nose-cone region of the fan 66.

The casing 38 is mounted within the chamber 73 such that the first electrical machine 32 is positioned concentrically with respect to the low-pressure spool 62 and the high-pressure spool 67. This positioning ensures that air flowing through the air intake 75 into the gas turbine engine 61 is not disrupted by the presence of the first electrical machine 32, as the airflow into the gas turbine engine 61 forms a generally annular shape. Therefore, there is no significant loss of engine performance caused by the presence of the first electrical machine 32 within the inlet air flow path into the gas turbine engine 61. In other examples, the casing 38 may be mounted within the chamber 73 such that the first electrical machine 32 is not positioned concentrically with respect to the low-pressure spool 62 and the high-pressure spool 67. For example, the first electrical machine 32 may be disposed towards an edge of the casing 38.

Due to the accessory gearbox 34 being mounted to the outer wall of the casing 38, when the casing is mounted within the chamber 73, the accessory gearbox 34 is in the desired position for coupling to the high-pressure spool 67 via the propulsion gearbox 77. In particular, the accessory gearbox 34 is coupled to the propulsion gearbox 77 via the input coupling 42.

The gas turbine engine assembly 60 also comprises an air heat exchanger 84. The air heat exchanger 84 is configured to receive a flow of air from the air intake 75. The air heat exchanger 84 receives the flow of air via a duct 85 diverting a portion of the airflow through the air intake 75 towards the air heat exchanger 84. The air heat exchanger 84 may be mounted to the air intake, the engine housing, and/or the airframe 82. Alternatively, the air heat exchanger 84 may be mounted to the outer wall of the casing 38. The air heat exchanger 84 is part of a cooling loop 54 which comprises a flow of coolant. The air heat exchanger 84 is configured to cool the coolant in the cooling loop 54 by the flow of air received from the air intake 75.

Figure 5:
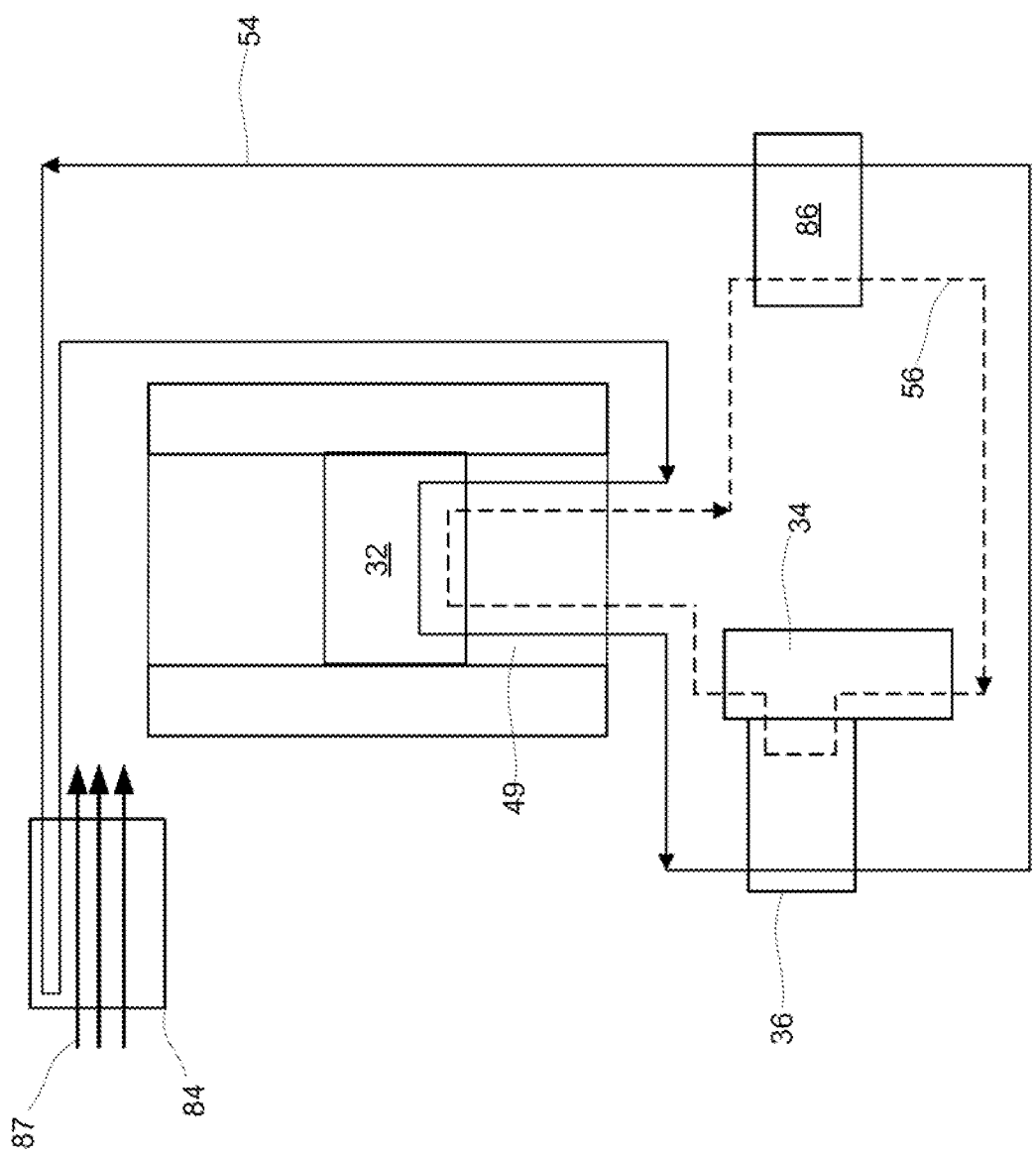
FIG. 5 is a schematic flow diagram for the first example accessory power module of FIGS. 2 and 3.

FIG. 5 shows the flow of accessory supply lines 50 through the gas turbine engine assembly 61. As discussed above, the accessory supply lines 50 can include a cooling loop 54 and a lubricant supply loop 56. The cooling loop 54 contains a flow of coolant, for example water glycol or oil. The lubricant supply loop 56 contains a flow of lubricant, for example lubricating oil. The cooling loop 54 comprises, in flow series, the air heat exchanger 84, the first electrical machine 32, the second electrical machine 36, and a lubricant heat exchanger 86. The cooling loop 54 also comprises a coolant pump (not shown) and suitable valves to enable the coolant to flow through the cooling loop 54. The air heat exchanger 84 is configured to cool the coolant by the flow of air 87 received from the air intake 75. The relatively low temperature coolant flows through and cools the first electrical machine 32 and the second electrical machine 36. The temperature of the coolant is consequently increased, but still remains relatively low compared to the temperature of the lubricant flowing through the lubricant heat exchanger 86, and so the lubricant heat exchanger 86 facilitates heat exchange between the coolant and the lubricant, such that the lubricant is cooled by the coolant. The relatively hot coolant returns to the air heat exchanger 84 which it can be cooled.

The lubricant supply loop 56 comprises, in flow series, the lubricant heat exchanger 86, the accessory gearbox 34, the second electrical machine 36, and the first electrical machine 32. The lubricant supply loop 56 is configured to supply a lubricant to each of the first electrical machine 32, the second electrical machine 36, and the accessory gearbox 34 in order to enable the components to function effectively. The lubricant supply loop 56 also comprises a lubricant pump (not shown) and suitable valves to enable the lubricant to flow through the lubricant supply loop 56. As discussed above, the lubricant heat exchanger 86 acts to cool the lubricant after it flows through the first electrical machine 32, the second electrical machine 36, and the accessory gearbox 34, by virtue of heat exchange with the coolant. The supply lines of the coolant and the lubricant to and from the first electrical machine 32 are provided within the accessory vane 49. Lubricant in the lubricant supply loop 56 may also be directed towards lubricating bearings or other components within the accessory power module 30.

The accessory power module 30 simplifies assembly of the gas turbine engine assembly 60. During assembly, the accessory power module 30 is moved to the desired position within the chamber 73 and mounted to one or more of the air intake, the engine housing, the air frame, and the fire bulkhead 76 at a respective attachment interface, to secure the accessory power module 30 in place. The first electrical machine 32 is coupled to the low-pressure spool 62 and the accessory gearbox 34 is coupled to the high-pressure spool 67 via the propulsion gearbox 77. This means that the number of connections and assembly steps required to incorporate the accessory gearbox and electrical machines within the gas turbine engine assembly is reduced in comparison with mounting each of the components separately.

Figure 6:
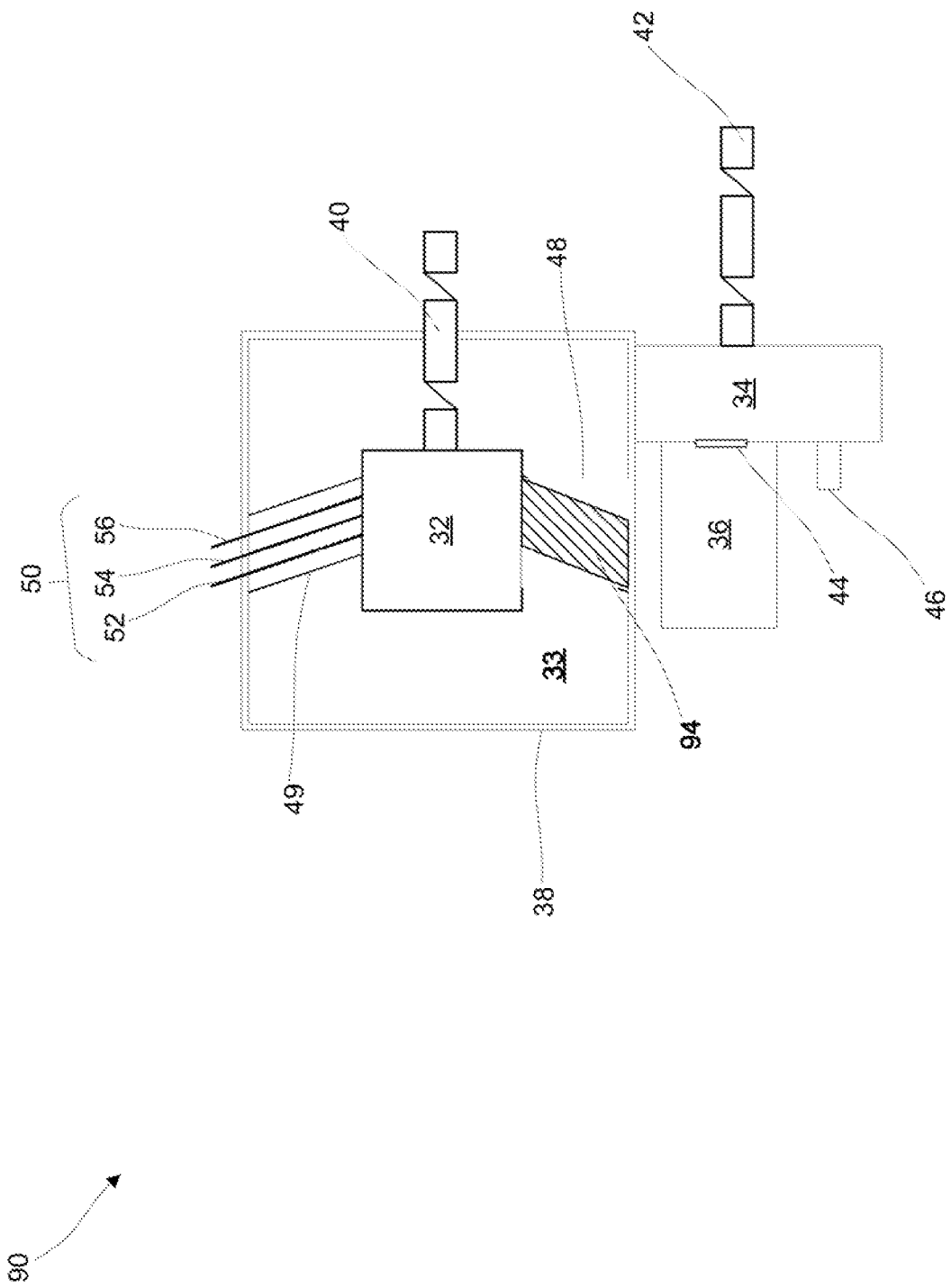
FIG. 6 is a sectional side view of a second example accessory power module according to the present disclosure.

FIG. 6 shows a second example accessory power module 90. The second example accessory power module 90 is substantially similar to the first example accessory power module 30, with like reference numerals denoting like features. The second example accessory power module 90 differs with respect to the first example accessory power module 30 by the arrangement of the air heat exchanger.

Figure 7:
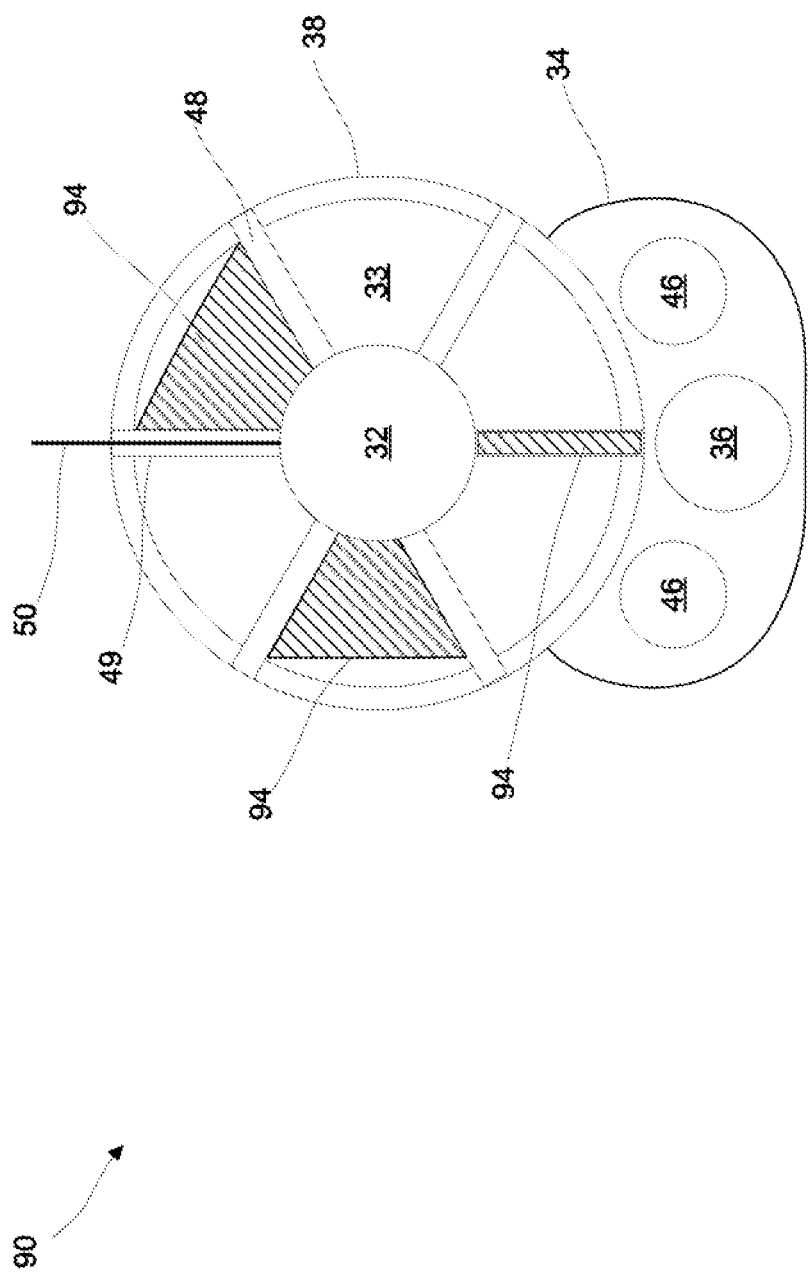
FIG. 7 is a front view of the second example accessory power module of FIG. 6.

The air heat exchanger 94 is located within the casing 38 of the accessory power module 90. In particular, the air heat exchanger 94 is arranged within the plurality of vanes supporting the first electrical machine 32. The air heat exchanger 94 can be integrated into a vane 48 of the plurality of vanes, such that the air heat exchanger 94 is housed within a vane 48 or is integrally formed as part of a vane 48. Alternatively, or in addition, the air heat exchanger 94 can be incorporated into a space between adjacent vanes of the plurality of vanes. For example, the air heat exchanger 94 may be formed as a wedge or segment configured to fit into a wedge or segment-like space between adjacent vanes in the duct 33. FIG. 7 shows a front view of the second example accessory power module 90, which illustrates the different arrangements of the air heat exchanger 94. A plurality of air heat exchangers 94 may be provided.

Figure 8:
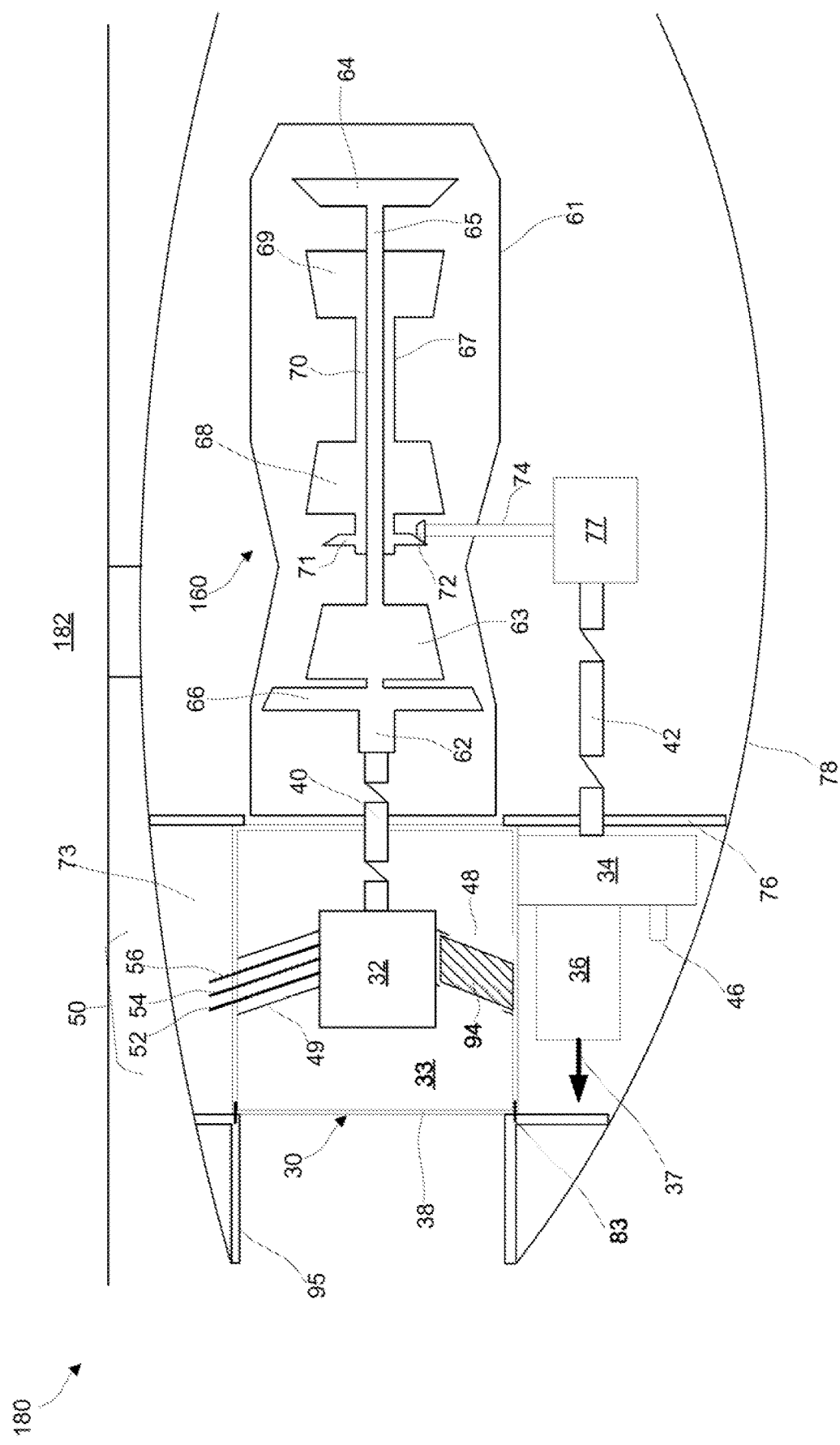
FIG. 8 is a sectional side view of a second example aircraft comprising the second example accessory power module of FIGS. 6 and 7.

FIG. 8 shows a second example aircraft 180 comprising a second example gas turbine engine assembly 160. The second example aircraft 180 and the second example gas turbine engine assembly 160 are substantially similar to the first example aircraft and the first example gas turbine engine assembly 60, with like reference numerals denoting like features. The second example differs with respect to the first example by the inclusion of the second example accessory power module 90 and the arrangement of the air heat exchanger 94.

As in the first example, the casing 38 of the accessory power module 90 is mounted along an inlet air flow path into the gas turbine engine 61. In particular, the casing 38 is attached to the air intake 95 at an attachment interface 83. The air heat exchanger 94 is mounted within the casing 38 of the accessory power module 90. In particular, the air heat exchanger 94 is arranged within the plurality of vanes 48. The air heat exchanger 94 is also disposed along the inlet air flow path into the gas turbine engine 61. The air heat exchanger 94 configured to receive a flow of air from the air intake 95. As the casing 38 has generally open axial ends, the casing 38 has an airflow duct 33 such that air flowing through the air intake 95 is configured to flow through the casing 38 before entering the gas turbine engine 61. The air heat exchanger 94 is therefore exposed to air flowing through the air intake 95 and through the casing 38. As in the first example aircraft 80, the air heat exchanger 94 is part of a cooling loop 54 which comprises a flow of coolant. The air heat exchanger 94 is configured to cool the coolant in the cooling loop 54 by the flow of air flowing past the air heat exchanger 94 in the casing 38.

Figure 9:
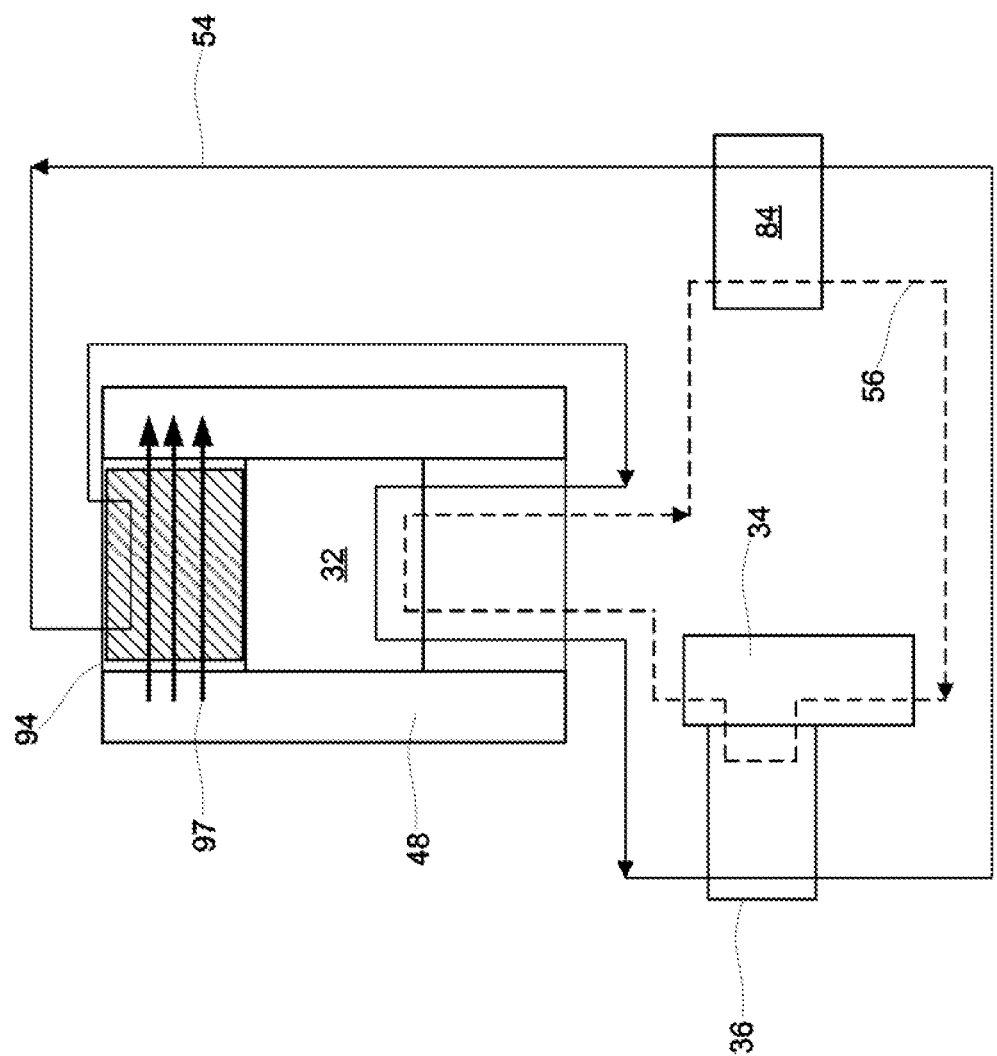
FIG. 9 is a schematic flow diagram for the second example accessory power module of FIGS. 6 and 7.

FIG. 9 illustrates the flow of accessory supply lines 50 through the second example gas turbine engine assembly 160. As in the first example gas turbine engine assembly 60, the accessory supply lines 50 can include a cooling loop 54 and a lubricant supply loop 56. The cooling loop 54 and the lubricant supply loop 56 function in substantially the same way as described for the first example gas turbine engine assembly 60. Where the second example gas turbine engine assembly 160 differs is that the air heat exchanger 94 is configured to cool the coolant flowing through the cooling loop 54 by air flowing past the air heat exchanger 94 within the casing 38.

The accessory power module of the present disclosure enables electrical and mechanical power generation from two spools of the gas turbine engine, whilst providing for easier assembly and maintenance. This is provided by the first and second electrical machines and the accessory gearbox being packaged as a single module which can be attached and detached to and from the air intake and/or airframe in fewer steps than if the components were separately attached. This also results in more simplified maintenance, as the components can be more easily accessed by detaching the accessory power module. Therefore, the accessory power module can be more readily integrated into an aircraft in comparison to integrating electrical machines separately. In addition, by routing accessory supply lines through the support element for the first electrical machine, for example through an accessory vane, the air flow into the gas turbine engine is not affected by the position of the accessory supply lines. This further improves the packaging efficiency of the accessory power module, whilst minimising negative effects on airflow into the gas turbine engine and the gas turbine engine performance. The accessory power module also packages the accessory supply lines, such as the lubricant supply loop and the cooling loop, such that the accessory supply lines can be readily attached and detached from the gas turbine engine assembly or the airframe as part of the accessory power module. The casing of the accessory power module provides a more efficient packaging arrangement for heat exchangers, for example an air heat exchanger for the cooling loop, as this obviates the need for locating heat exchangers elsewhere in the airframe.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A gas turbine engine assembly comprising:
a gas turbine engine having a high-pressure spool and a low-pressure spool;
an air intake for the gas turbine engine, the air intake defining at least part of an inlet air flow path into the gas turbine engine;
an accessory power module comprising:
a first electrical machine coupled to the low-pressure spool of the gas turbine engine;
a casing housing the first electrical machine, the casing comprising at least one support element configured to support the first electrical machine within the casing, wherein the casing is configured for airflow therethrough, said airflow passing from the air intake, through the casing and into a compressor of the gas turbine engine;
an accessory gearbox comprising an input coupling coupled to the high-pressure spool of the gas turbine engine, the accessory gearbox mounted to the casing; and a second electrical machine coupled to an output coupling of the accessory gearbox; and an engine housing that surrounds the gas turbine engine, the air intake, and the accessory power module, wherein the casing is attached to the air intake and/or the engine housing so that the casing is mounted between the air intake and the gas turbine engine and defines a portion of the inlet air flow path from the air intake into the compressor of the gas turbine engine.

2. The gas turbine engine assembly as claimed in claim 1, wherein the accessory gearbox is mounted to an external surface of the casing so that the accessory gearbox is positioned between the casing of the accessory power module and the engine casing.

3. The gas turbine engine assembly as claimed in claim 1, wherein the casing comprises an annular wall; and wherein the accessory gearbox is mounted to the annular wall between the casing of the accessory power module and the engine casing.

4. The gas turbine engine assembly as claimed in claim 1, wherein the at least one support element is configured to support the first electrical machine within the casing such that the first electrical machine is positioned concentrically with respect to the high-pressure spool and the low-pressure spool.

5. The gas turbine engine assembly as claimed in claim 1, wherein the casing comprises at least one accessory conduit configured to carry one or more accessory supply lines to and from the first electrical machine.

6. The gas turbine engine assembly as claimed in claim 5, wherein the at least one accessory conduit is formed as part of the at least one support element.

7. The gas turbine engine assembly as claimed in claim 5, wherein the one or more accessory supply lines include at least a portion of an electrical supply line, a lubricant supply loop, and/or a cooling loop.

8. The gas turbine engine assembly as claimed in claim 1, further comprising an air heat exchanger contained within the casing, the air heat exchanger configured for heat exchange with air flow along the inlet air flow path into the gas turbine engine.

9. The gas turbine engine assembly as claimed in claim 8, wherein the air heat exchanger is part of a cooling loop, the air heat exchanger configured to provide heat exchange between a coolant in the cooling loop and air flow along an inlet air flow path into the gas turbine engine.

10. The gas turbine engine assembly as claimed in claim 9, further comprising a lubricant heat exchanger part of a lubricant supply loop, the lubricant heat exchanger configured to provide heat exchange between the coolant in the cooling loop and a lubricant in the lubricant loop.

11. The gas turbine engine assembly as claimed in claim 8, wherein the air heat exchanger is incorporated into the at least one support element.

12. The gas turbine engine assembly as claimed in claim 1, wherein the support element comprises a plurality of vanes extending radially between an outer wall of the casing and the first electrical machine.

13. The gas turbine engine assembly as claimed in claim 12, wherein the at least one accessory conduit is formed as part of one or more vanes of the plurality of vanes.

14. The gas turbine engine assembly as claimed in claim 12, wherein the air heat exchanger is disposed between adjacent vanes of the plurality of vanes.

15. The gas turbine engine assembly as claimed in claim 12, wherein a heat exchanger is integrated into one or more vanes of the plurality of vanes.

16. The gas turbine engine assembly as claimed in claim 1, further comprising:

a power offtake shaft coupled to a power output coupling of the high-pressure spool, a propulsion gearbox coupled between the power offtake shaft and the input coupling of the accessory gearbox, wherein the propulsion gearbox is configured to provide power to one or more propulsion sub-systems of the gas turbine engine.

17. The gas turbine engine assembly as claimed in claim 16, wherein the power offtake shaft is a radial drive shaft.

18. The gas turbine engine assembly as claimed in claim 1, further comprising an air heat exchanger contained between the casing and the engine housing, the air heat exchanger configured for heat exchange with air flow along the inlet air flow path into the gas turbine engine.

19. The gas turbine engine assembly as claimed in claim 1, further comprising a fire bulkhead separates the airframe and the air intake from the gas turbine engine; and wherein the casing is attached to the fire bulkhead.

* * * * *